(12) United States Patent
Nagata et al.

(10) Patent No.: US 10,283,758 B2
(45) Date of Patent: *May 7, 2019

(54) POSITIVE-ELECTRODE MIXTURE, MANUFACTURING METHOD THEREFOR, AND ALL-SOLID-STATE LITHIUM-SULFUR BATTERY

(71) Applicant: Nagase ChemteX Corporation, Osaka-shi, Osaka (JP)

(72) Inventors: Hiroshi Nagata, Hyogo (JP); Yasuo Chikusa, Hyogo (JP)

(73) Assignee: Nagase ChemteX Corporation, Osaka (JP)

(*) Notice: Subject to any disclaimer, the term of this patent is extended or adjusted under 35 U.S.C. 154(b) by 322 days.

This patent is subject to a terminal disclaimer.

(21) Appl. No.: 15/027,162

(22) PCT Filed: Oct. 1, 2014

(86) PCT No.: PCT/JP2014/076243
§ 371 (c)(1),
(2) Date: Apr. 4, 2016

(87) PCT Pub. No.: WO2015/056564
PCT Pub. Date: Apr. 23, 2015

(65) Prior Publication Data
US 2016/0254529 A1    Sep. 1, 2016

(30) Foreign Application Priority Data
Oct. 16, 2013    (JP) ................................. 2013-215657

(51) Int. Cl.
*H01M 4/02*    (2006.01)
*H01M 4/04*    (2006.01)
(Continued)

(52) U.S. Cl.
CPC ............ *H01M 4/136* (2013.01); *H01M 4/04* (2013.01); *H01M 4/13* (2013.01); *H01M 4/139* (2013.01);
(Continued)

(58) Field of Classification Search
CPC ............ Y02T 10/7011; H01M 10/052; H01M 10/0525; H01M 10/0562;
(Continued)

(56) References Cited

U.S. PATENT DOCUMENTS

2011/0286905 A1* 11/2011 Waki ................. C01B 25/10
423/301
2012/0009484 A1    1/2012 Aburatani et al.
(Continued)

FOREIGN PATENT DOCUMENTS

CN    102388420    3/2012
EP    2784849    10/2014
(Continued)

*Primary Examiner* — Eugenia Wang
(74) *Attorney, Agent, or Firm* — Hamre, Schumann, Mueller & Larson, P.C.

(57) ABSTRACT

The present invention aims to maximize the advantageous physical properties of sulfur and provide a cathode mixture that can be suitably used in a cathode mixture layer of an all-solid-state lithium-sulfur battery having excellent charge/discharge capacity. The present invention also aims to provide an all-solid-state lithium-sulfur battery including a cathode mixture layer containing the cathode mixture. The present invention relates to a cathode mixture for use in a cathode mixture layer of an all-solid-state lithium-sulfur battery, the cathode mixture containing the following components (A) to (D): (A) sulfur and/or its discharge product; (B) elemental phosphorus and/or $P_xS_y$, where x and y inde-
(Continued)

pendently represent an integer that gives a stoichiometric ratio; (C) an ion-conductive material; and (D) a conductive material.

12 Claims, 1 Drawing Sheet

(51) Int. Cl.

| | | |
|---|---|---|
| *H01M 4/13* | (2010.01) | |
| *H01M 4/36* | (2006.01) | |
| *H01M 4/38* | (2006.01) | |
| *H01M 4/58* | (2010.01) | |
| *H01M 4/62* | (2006.01) | |
| *H01M 4/136* | (2010.01) | |
| *H01M 4/139* | (2010.01) | |
| *H01M 10/052* | (2010.01) | |
| *H01M 4/1397* | (2010.01) | |
| *H01M 10/0525* | (2010.01) | |
| *H01M 10/0562* | (2010.01) | |

(52) U.S. Cl.
CPC ......... *H01M 4/1397* (2013.01); *H01M 4/364* (2013.01); *H01M 4/38* (2013.01); *H01M 4/5815* (2013.01); *H01M 4/625* (2013.01); *H01M 10/052* (2013.01); *H01M 10/0525* (2013.01); *H01M 10/0562* (2013.01); *H01M 2004/028* (2013.01); *Y02T 10/7011* (2013.01)

(58) Field of Classification Search
CPC .... H01M 2004/028; H01M 4/04; H01M 4/13; H01M 4/136; H01M 4/139; H01M 4/1397; H01M 4/364; H01M 4/38; H01M 4/5815; H01M 4/625
See application file for complete search history.

(56) References Cited

U.S. PATENT DOCUMENTS

2013/0302684 A1* 11/2013 Koshika ............... H01M 4/5805
429/220
2014/0011069 A1 1/2014 Zhou
2014/0315102 A1 10/2014 Tsuji et al.

FOREIGN PATENT DOCUMENTS

| | | |
|---|---|---|
| JP | 2008-027581 | 2/2008 |
| JP | 2010-033875 | 2/2010 |
| JP | 2011-181260 | 9/2011 |
| JP | 2012-069305 | 4/2012 |
| JP | 2013-069415 | 4/2013 |
| JP | 2013-80637 | 5/2013 |
| JP | 2013-110051 | 6/2013 |
| JP | 2013-258079 | 12/2013 |
| JP | 2013-258080 | 12/2013 |
| JP | 2014-029777 | 2/2014 |
| JP | 2014-160572 | 9/2014 |
| WO | 2012/086196 | 6/2012 |
| WO | 2013/076955 | 5/2013 |

* cited by examiner

POSITIVE-ELECTRODE MIXTURE, MANUFACTURING METHOD THEREFOR, AND ALL-SOLID-STATE LITHIUM-SULFUR BATTERY

TECHNICAL FIELD

The present invention relates to a cathode mixture, a method for producing the same, and an all-solid-state lithium-sulfur battery.

BACKGROUND ART

Sulfur is known to possess a very high theoretical capacity of about 1672 mAh/g, and lithium-sulfur batteries in which sulfur is used as a cathode active material have been the subject of active studies. Lithium-sulfur batteries are roughly classified into liquid lithium-sulfur batteries in which the electrolyte is liquid, and all-solid-state lithium-sulfur batteries in which the electrolyte is solid.

A drawback of the liquid lithium-sulfur batteries is that lithium polysulfide generated by the reaction of lithium ions with sulfur is dissolved into the electrolyte solution, thereby adversely affecting the charge/discharge capacity and the life of the batteries.

In contrast, the all-solid-state lithium-sulfur batteries are free from the drawback that lithium polysulfide is dissolved into the electrolyte solution, and are thus suitable in maintaining the battery charge/discharge capacity and prolonging the battery life. Moreover, for example, they are free of combustible organic solvents and thus can ensure safety without the risk of electrolyte leakage or ignition, and they do not require a separator. These excellent characteristics of the all-solid-state lithium-sulfur batteries have been drawing attention. In the cathode mixture layer of the all-solid-state lithium-sulfur batteries, a reversible reaction represented by the following formula (1) occurs, wherein the reaction toward the right predominantly proceeds during discharge, and the reaction toward the left predominantly proceeds during charge.

$$S + 2Li^+ + 2e^- \rightleftharpoons Li_2S \quad (1)$$

In the all-solid-state lithium-sulfur batteries, however, since the anode, the solid electrolyte layer, and the cathode mixture layer are substantially free of solvents, and the sulfur contained as a cathode active material in the cathode mixture layer has electrical insulation properties, the cathode mixture layer has very low electron conductivity and very low lithium-ion conductivity. Accordingly, disadvantageously, the all-solid-state lithium-sulfur batteries exhibit poor reactivity in the reaction shown in the formula (1) during charge and discharge, thereby failing to ensure a sufficient charge/discharge capacity.

Patent Literature 1 discloses a cathode for all-solid lithium secondary batteries which is prepared by mechanically milling a starting material mixture containing sulfur, a carbon material having an average particle size of 100 nm or less, and an electrolyte represented by $Li_2S$—$P_xS_y$, where x and y each represent an integer that gives a stoichiometric ratio, and molding the resulting complex. According to this literature, with the cathode for all-solid lithium secondary batteries formed of the above molded product, the batteries have a high charge/discharge capacity and can be charged and discharged at a high current density.

CITATION LIST

Patent Literature

Patent Literature 1: JP 2011-181260 A

SUMMARY OF INVENTION

Technical Problem

In fact, however, the cathode for all-solid lithium secondary batteries disclosed in Patent Literature 1 can have difficulty in ensuring a sufficient charge/discharge capacity when used at practical electric current levels even in low power applications such as smartphones or personal computers although it has less difficulty at unpractically low currents. For example, if a cathode made from sulfur, a conductive material, and $80Li_2S$-$20P_2S_5$ as disclosed in the examples of Patent Literature 1 is used as a cathode of an all-solid-state lithium-sulfur battery, such a battery may show an insufficient charge/discharge capacity when high current flows. Thus, all-solid-state lithium-sulfur batteries including the traditional cathode mixture layer still need improvement in their charge/discharge capacity. In the present situation, there is a problem that the advantageous physical properties of sulfur cannot be fully maximized to achieve an all-solid-state lithium-sulfur battery that can withstand use at practically high currents.

The present invention aims to maximize the advantageous physical properties of sulfur and provide a cathode mixture that can be suitably used in a cathode mixture layer of an all-solid-state lithium-sulfur battery having excellent charge/discharge capacity. The present invention also aims to provide an all-solid-state lithium-sulfur battery including a cathode mixture layer containing the cathode mixture.

Solution to Problem

As a result of various studies on cathode mixtures for use in all-solid-state lithium-sulfur batteries, the present inventors obtained the following findings: elemental phosphorus or phosphorus sulfide together with sulfur and/or its discharge product can be used as cathode active materials in an all-solid-state lithium-sulfur battery to improve the charge/discharge capacity, especially when high current flows. The present invention was completed based on such findings.

The cathode mixture of the present invention is a cathode mixture for use in a cathode mixture layer of an all-solid-state lithium-sulfur battery, the cathode mixture containing the following components (A) to (D):
(A) sulfur and/or its discharge product;
(B) elemental phosphorus and/or $P_xS_y$, where x and y independently represent an integer that gives a stoichiometric ratio;
(C) an ion-conductive material; and
(D) a conductive material.

In the cathode mixture of the present invention, the component (C) is preferably a composite of Li, S, and P, and preferably contains P at a weight ratio of 0.15 to 0.55.

The composite of Li, S, and P is more preferably obtained by mechanically milling at least a combination of $Li_2S$, S, and P, or at least a combination of $Li_2S$ and $P_xS_y$, where x and y independently represent an integer that gives a stoichiometric ratio.

The cathode mixture of the present invention is preferably obtained by mixing the component (A) and the component (B) first and then mixing the resulting mixture with the component (C) and the component (D).

In the cathode mixture of the present invention, the component (B) is preferably present in an amount of 1 to 35% by weight of the amount of the component (A).

In the cathode mixture of the present invention, the component (D) preferably includes a conductive component (D1) that includes a carbon material having a specific surface area of 1000 m$^2$/g or more. The component (D) may further include at least one conductive component (D2) selected from the group consisting of graphite, acetylene black, carbon nanotube, and carbon fiber.

In the cathode mixture of the present invention, the component (A) and the component (B) are preferably present in a combined amount of 40% by weight or more of the total cathode mixture.

The composite of Li, S, and P may be obtained by mechanically milling the combination of Li$_2$S, S, and P or the combination of Li$_2$S and P$_x$S$_y$, and further at least one selected from the group consisting of M$_z$S where M represents Si, Ge, B, or Al, and z represents an integer that gives a stoichiometric ratio, phosphorus oxide, lithium oxide, and lithium iodide.

The all-solid-state lithium-sulfur battery of the present invention includes: a cathode mixture layer containing the cathode mixture of the present invention; a solid electrolyte layer; an anode; and a current collector.

The method for producing the cathode mixture of the present invention at least includes:

step (1) of mixing the component (A) and the component (B); and step (2) of mixing a mixture obtained in the step (1) with the component (C) and the component (D) simultaneously or separately.

Advantageous Effects of Invention

The cathode mixture of the present invention contains (B) elemental phosphorus and/or P$_x$S$_y$, in combination with (A) sulfur and/or its discharge product, (C) an ion-conductive material, and (D) a conductive material. The component (B) serves, together with the component (A), as a cathode active material in the cathode mixture. Then, the reactivity of the reaction shown in the formula (1) is improved by electron donation from P of the component (B) to S of the component (A). As a result, if such a cathode mixture is used in a cathode mixture layer of an all-solid-state lithium-sulfur battery, the provided all-solid-state lithium-sulfur battery shows low resistance when sulfur, electrons, and lithium ions react with each other at the reaction interface, and thus has excellent charge/discharge characteristics. In particular, the present invention is advantageous in that a high charge/discharge capacity is shown not only at a low current (for example, about 0.5 to 1.0 mA/cm$^2$) but also at a high current (for example, 5 mA/cm$^2$ or more).

Moreover, since the all-solid-state lithium-sulfur battery of the present invention includes a cathode mixture layer containing the cathode mixture of the present invention, it has excellent charge/discharge characteristics.

Moreover, since the method for producing the cathode mixture of the present invention includes mixing the component (A) and the component (B) first and then mixing the resulting mixture with the component (C) and the component (D), the electron donation from P of the component (B) to S of the component (A) is more ensured for the cathode active materials in the obtained cathode mixture. The produced cathode mixture can provide an all-solid-state lithium-sulfur battery having excellent charge/discharge characteristics.

The cathode mixture and the all-solid-state lithium-sulfur battery including the cathode mixture can be used in, for example, electric cars or hybrid cars, and the present invention therefore can contribute to reducing $CO_2$ emissions.

DESCRIPTION OF EMBODIMENTS

Cathode Mixture

Figure 1:
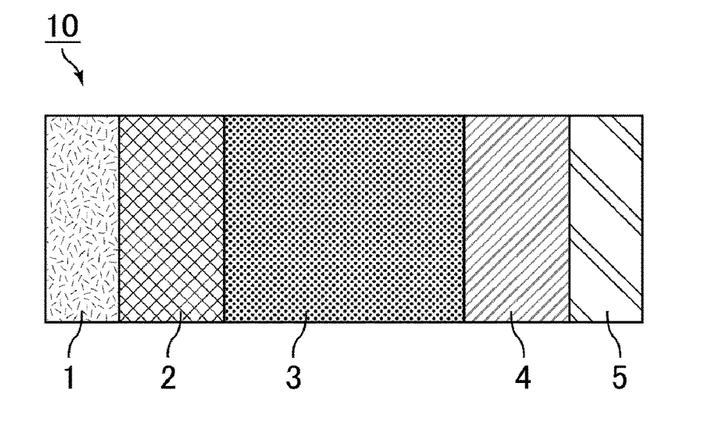
The FIGURE is a cross-sectional view schematically showing an exemplary embodiment of the all-solid-state lithium-sulfur battery of the present invention.

A description is given on the cathode mixture of the present invention first.

The cathode mixture of the present invention is characterized as a cathode mixture for use in a cathode mixture layer of an all-solid-state lithium-sulfur battery, the cathode mixture containing the following components (A) to (D):

(A) sulfur and/or its discharge product;
(B) elemental phosphorus and/or P$_x$S$_y$, where x and y independently represent an integer that gives a stoichiometric ratio;
(C) an ion-conductive material; and
(D) a conductive material.

<Component (A): Sulfur and/or its Discharge Product>

The cathode mixture of the present invention contains (A) sulfur and/or its discharge product as a cathode active material. The sulfur may be elemental sulfur. The discharge product of sulfur is not particularly limited, and examples include lithium polysulfides such as Li$_2$S$_8$, Li$_2$S$_4$, and Li$_2$S$_2$, and lithium sulfide (Li$_2$S). These compounds may be used alone or in combinations of two or more. These compounds may also be used with elemental sulfur.

<Component (B): Elemental Phosphorus and/or P$_x$S$_y$>

The cathode mixture of the present invention contains (B) elemental phosphorus and/or P$_x$S$_y$, where x and y independently represent an integer that gives a stoichiometric ratio. Specific examples of the P$_x$S$_y$ include P$_2$S$_3$, P$_2$S$_5$, P$_4$S$_3$, and P$_4$S$_7$. The cathode mixture may contain only one type of component (B) or may contain two or more types of components (B) in combination.

The cathode mixture of the present invention contains the above-described components (A) and (B) as cathode active materials. Since the cathode mixture contains such specific two types of components as cathode active materials, the reactivity of the reaction shown in the formula (1) is improved by electron donation from P of the component (B) to S of the component (A), as described above. As a result, if such a cathode mixture is used in a cathode mixture layer of an all-solid-state lithium-sulfur battery, the provided all-solid-state lithium-sulfur battery shows low resistance when sulfur, electrons, and lithium ions react with each other at the reaction interface, and thus has excellent charge/discharge characteristics.

The amount of the component (B) is preferably 1 to 35% by weight of the amount of the component (A). If the amount of the component (B) relative to the component (A) is less than 1% by weight, the effect of improving the reactivity of sulfur by phosphorus may be insufficient, thereby failing to achieve a large discharge capacity. Conversely, if the amount is more than 35% by weight, the amount of the component (A) in the cathode mixture is reduced, possibly resulting in a decrease in discharge capacity.

<Component (C): Ion-Conductive Material>

The cathode mixture of the present invention contains the ion-conductive material (C) as a solid electrolyte. The ion-conductive material (C) is not particularly limited, and those used in the technical field related to the present application may be used. The ion-conductive material (C) preferably contains phosphorus, and specific examples include composites of Li, S, and P. If the ion-conductive material (C) contains phosphorus, the weight ratio of phosphorus is preferably 0.15 to 0.55.

The use of such an ion-conductive material containing a specific amount of phosphorus reduces resistance when sulfur, electrons, and lithium ions react with each other at the reaction interface in the cathode mixture layer, thereby improving the charge/discharge capacity of the all-solid-state lithium-sulfur battery. In contrast, if the weight ratio of phosphorus in the ion-conductive material (C) is less than 0.15 or more than 0.55, a sufficient charge/discharge capacity cannot be ensured for an all-solid-state lithium-sulfur battery including such a cathode mixture in some cases, depending on the amperage during charge or discharge. In this regard, it is presumed that if the weight ratio of phosphorus is more than 0.55, the interaction will occur so that phosphorus excessively acts on sulfur and thus the effect of deactivating sulfur is increased, resulting in reduced charge/discharge capacity.

The composite of Li, S, and P is preferably a composite obtained by mechanically milling $Li_2S$, S, and P (hereafter, referred to simply as the composite of $Li_2S$, S, and P) or a composite obtained by mechanically milling $Li_2S$ and $P_xS_y$, where x and y independently represents an integer that gives a stoichiometric ratio (hereafter, referred to simply as the composite of $Li_2S$ and $P_xS_y$). This is because by mechanical milling, bonds can be easily rearranged and an amorphous ion-conductive material can be obtained.

The term "composite" as used herein does not refer to a mere mixture of predetermined components, but refers to a mixture of predetermined components to which a mechanical, thermal, or chemical energy has been applied to cause part or all of the predetermined components to undergo a chemical reaction. Moreover, the phrase "formed into a composite" as used herein does not refer to merely mixing predetermined components, but refers to mixing predetermined components followed by applying a mechanical, thermal, or chemical energy to cause part or all of the predetermined components to undergo a chemical reaction.

If the ion-conductive material is the composite of $Li_2S$, S, and P or the composite of $Li_2S$ and $P_xS_y$, the molar ratio of $Li_2S$ in each of the composites may be arbitrarily selected. Preferably, the molar ratio of $Li_2S$ is an amount such that the composite contains phosphorus at a weight ratio of 0.15 to 0.55.

The mechanical milling may be carried out by conventionally known methods. Specifically, the mechanical milling may be carried out, for example, by using a planetary ball mill at a rotation speed of 225 to 500 rpm and a revolution speed of 450 to 1000 rpm (in the counter direction to the rotation) for 0.5 to 10 hours.

Whether $Li_2S$ and $P_xS_y$ have been formed into a composite or merely mixed can be determined by Raman spectroscopy. For example, in the case of a composite of $Li_2S$ and $P_2S_5$, a peak at 300 $cm^{-1}$ from $P_2S_5$ used as a starting material of the composite disappears or becomes small relative to the main peak around 400 $cm^{-1}$. This indicates that $Li_2S$ and $P_2S_5$ have been formed into a composite.

The composite of Li, S, and P may be obtained by mechanically milling at least one selected from the group consisting of $M_zS$ where M represents Si, Ge, B, or Al, and z represents an integer that gives a stoichiometric ratio, phosphorus oxide, lithium oxide, and lithium iodide, together with $Li_2S$, S, and P or with $Li_2S$ and $P_xS_y$. This is because the ion conductivity of the component (C) may be improved.

For the same reason, the composite of $Li_2S$ and $P_xS_y$ may further contain a lithium salt or a lithium nitride. The lithium slat is not particularly limited, and examples include $Li_3PO_4$, $Li_4SiO_4$, and $LiBH_4$. The lithium nitride is also not particularly limited, and examples include $Li_3N$.

<Component (D): Conductive Material>

The cathode mixture of the present invention contains the conductive material (D) as an electronic conductor. The conductive material (D) is not particularly limited, and examples include acetylene black, activated charcoal, furnace black, carbon nanotube, graphene, and carbon fiber. The component (D) may include only one type of conductive component or two or more types of conductive components.

The component (D) preferably includes a conductive component (D1) that includes a carbon material having a specific surface area of 1000 $m^2/g$ or more. This is because the use of the conductive component having a specific surface area of 1000 $m^2/g$ or more increases the number of reaction points between the component (A) and the component (D) and is thus suitable for providing an all-solid-state lithium-sulfur battery having excellent charge/discharge capacity. The conductive component (D1) more preferably has a specific surface area of 1800 $m^2/g$ or more. The conductive component (D1) is preferably activated charcoal or a furnace black having a hollow shell structure (Ketjen black (Lion Corporation)).

The term "specific surface area" as used herein refers to a BET specific surface area determined by the Brenauer-Emmet-Telle (BET) method. Specifically, it is determined using a nitrogen adsorption isotherm measured by adsorbing nitrogen gas onto a conductive material sample at liquid nitrogen temperature. As an apparatus to determine the BET specific surface area, for example, an automatic specific surface area/pore distribution measuring apparatus (BEL-SORP-mini II, BEL Japan, Inc.) may be used.

The furnace black having a hollow shell structure refers to one type of conductive furnace black that has a hollow shell structure with a porosity of about 60 to 80%. The term "hollow shell structure" refers to a structure in which an outer shell in particle form is formed by thinly assembled graphite crystals, and the inside of the outer shell is hollow.

The conductive component (D1) is preferably in the shape of particles having an average particle size of 0.2 to 200 μm. If the average particle size is less than 0.2 μm, such a component may be difficult to handle because, for example, it can easily scatter. Conversely, if the average particle size is more than 200 μm, such a component may show poor dispersibility in the cathode mixture, resulting in reduced charge/discharge capacity. The average particle size as used herein refers to a volume average particle size measured by a laser diffraction method.

The component (D) may further include at least one conductive component (D2) selected from the group consisting of graphite, acetylene black, carbon nanotube, and carbon fiber, in addition to the conductive component (D1). This is because if the electric conductivity of the conductive component (D1) is low, the further use of the conductive component (D2) having a high electric conductivity improves electron conductivity in the cathode mixture, which may result in further improved charge/discharge capacity.

In the case where the component (D) includes the conductive component (D2) together with the conductive component (D1), the weight ratio thereof ((D1):(D2)) is preferably 9.5:0.5 to 5:5. This is because the reaction shown in the formula (1) can be more promoted by increasing the proportion of the conductive component (D1) which has a large specific surface area and can provide many reaction points with the component (A).

In the cathode mixture of the present invention, the combined amount of the component (A) and the component (B) (hereafter, also referred to as the total amount of the components (A) and (B)) is preferably 40% by weight or more of the total cathode mixture. If the total amount of the components (A) and (B) is less than 40% by weight of the total cathode mixture, although a certain charge/discharge capacity (for example, 200 mAh/g or more per cathode mixture) can be ensured when low current flows, the charge/discharge capacity may be insufficient when high current flows.

The total amount of the components (A) and (B) is preferably 65% by weight or less of the total cathode mixture. If the total amount of the components (A) and (B) is more than 65% by weight of the total cathode mixture, the proportion of the ion-conductive material (C) and the conductive material (D) in the cathode mixture is reduced, possibly resulting in a decrease in charge/discharge efficiency. The total amount of the components (A) and (B) is more preferably 50 to 65% by weight of the total cathode mixture.

In the cathode mixture of the present invention, the ratio of the components, i.e., the ratio of the total amount of the components (A) and (B), the amount of the component (C), and the amount of the component (D) (component (A)+component (B): component (C): component (D)), by weight, is preferably 40-65:10-50:5-25. If the proportion of the ion-conductive material (C) is smaller than, the above range, the amount of lithium ions that can move to the cathode is reduced, possibly resulting in an insufficient charge/discharge capacity. Conversely, if the proportion is larger than the above range, the proportion of the conductive material (D) in the cathode mixture is reduced, possibly resulting in a lowered charge/discharge capacity per cathode mixture. Moreover, if the proportion of the conductive material (D) is smaller than the above range, the amount of electrons that can move to the cathode is reduced, possibly resulting in an insufficient charge/discharge capacity. Conversely, if the proportion is larger than the above range, the proportion of the ion-conductive material (C) in the cathode mixture is reduced, possibly resulting in a lowered charge/discharge capacity per cathode mixture.

The cathode mixture of the present invention is preferably obtained by mixing the component (A) and the component (B) first and then mixing the resulting mixture with the component (C) and the component (D). This is because in such a cathode mixture, it is more ensured that the component (A) and the component (B) exist close to each other, and therefore the electron donation from P of the component (B) to S of the component (A) is more ensured.

The cathode mixture of the present invention may contain optional components such as a binder or solvent, if necessary.

<Binder>

The binder is not particularly limited, and may be a thermoplastic resin, a thermosetting resin, or the like. Examples include polyethylene, polypropylene, polytetrafluoroethylene (PTFE), polyvinylidene fluoride (PVDF), styrene butadiene rubber, tetrafluoroethylene-hexafluoroethylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. These binders may be used alone or in combinations of two or more. Although the amount of the binder is not particularly limited, the binder is preferably present in an amount of 0.01 to 10% by weight in the cathode mixture.

<Solvent>

The solvent is not particularly limited, and examples include amine solvents such as N,N-dimethylaminopropylamine and diethylenetriamine, ether solvents such as tetrahydrofuran, ketone solvents such as methyl ethyl ketone, ester solvents such as methyl acetate, amide solvents such as dimethylacetamide and 1-methyl-2-pyrrolidone, and hydrocarbon solvents such as toluene, xylene, n-hexane, and cyclohexane. These solvents may be used alone or in combinations of two or more. Although the amount of the solvent is not particularly limited, the solvent is preferably present in an amount of 10 to 99% by weight in the cathode mixture. A cathode mixture layer can be easily prepared from the cathode mixture containing the solvent. The solvent is removed by drying in the preparation of a cathode mixture layer.

<Method for Producing Cathode Mixture>

The cathode mixture of the present invention can be obtained by mixing the sulfur and/or its discharge product (A), the elemental phosphorus and/or $P_xS_y$ (B), the ion-conductive material (C), and the conductive material (D), and optional components such as a binder or solvent, if necessary.

The method for producing the cathode mixture of the present invention is preferably characterized by at least including:

step (1) of mixing the component (A) and the component (B); and step (2) of mixing a mixture obtained in the step (1) with the component (C) and the component (D) simultaneously or separately.

When the cathode mixture is prepared by mixing the components (A) and (B), which serve as cathode active materials in the cathode mixture, first and then mixing the resulting mixture with other components as described above, the component (A) and the component (B) are located close to each other in the resulting cathode mixture, and therefore electron donation from P of the component (B) to S of the component (A) is allowed to proceed at a high probability. This electron donation significantly improves the reactivity of the reaction shown in the formula (1). As a result, if the cathode mixture is used in a cathode mixture layer of an all-solid-state lithium-sulfur battery, the resulting all-solid-state lithium-sulfur battery shows low resistance when sulfur, electrons, and lithium ions react with each other at the reaction interface, and thus has excellent charge/discharge characteristics.

Thus, the present invention also encompasses a method for producing the cathode mixture which characteristically includes the steps (1) and (2).

In the steps (1) and (2), the components may be mixed by any method, such as, for example, by using Planetary Ball Mill (Fritsch), Hybridization System (Nara Machinery Co., Ltd.), Cosmos (Kawasaki Heavy Industries, Ltd.), Mechano Fusion System (Hosokawa Micron Corporation), Nobilta NOB (Hosokawa Micron Corporation), Mechanomill (Okada Seiko Co., Ltd.), Thetacomposer (Tokuju Corporation), Nanosonic Mill (Inoue MFG., Inc.), Kneader (Inoue MFG., Inc.), Supermasscolloider (Masuko Sangyo Co., Ltd.), nano-mech REACTOR (Techno-eye), Konel Despa (Asada Iron Works Co., Ltd.), Planetary Mixer (Asada Iron Works Co., Ltd.), Miracle KCK (Asada Iron Works Co., Ltd.), or the like. The mixing conditions are not particularly limited, and may be at a rotation speed of 100 to 200 rpm and a revolution speed of 200 to 400 rpm (in the counter direction to the rotation) for 0.5 to 10 hours.

In the step (2), when the mixture of the component (A) and the component (B) is mixed with the other components (the component (C), the component (D), and other components), the mixing order is not particularly limited. The mixture and the other components may be mixed all at once, or alternatively, the component (C), the component (D), and other components may be added to and mixed with the mixture separately from each other at any timing.

In the method for producing the cathode mixture, the step (2) may be followed by heat treatment. This is because heat treatment can increase the strength of the contact interfaces of the components (A) to (D) in the cathode mixture and thus can reduce the interfacial resistance. The heat treatment may be carried out in any manner, such as, for example, at 80° C. to 250° C., preferably 100° C. to 200° C., for one second to 10 hours in an atmosphere of argon, nitrogen, air or the like. The heat treatment may be carried out using conventionally known heating apparatuses. Specific examples include constant temperature dryers, fan dryers, vacuum dryers, and infrared dryers.

<<All-Solid-State Lithium-Sulfur Battery>>

Next, the all-solid-state lithium-sulfur battery of the present invention will be described with reference to drawings. The all-solid-state lithium-sulfur battery includes a cathode mixture layer containing the cathode mixture of the present invention, a solid electrolyte layer, an anode, and a current collector.

The term "all-solid-state" as used herein refers to one that includes a polymeric solid electrolyte and/or an inorganic solid electrolyte as the electrolyte, in which the anode, the solid electrolyte layer, and the cathode mixture layer are substantially free of solvents. The phrase "substantially free of solvents" as used herein means that a trace amount of solvent may be left.

The FIGURE is a cross-sectional view schematically showing an exemplary embodiment of the all-solid-state lithium-sulfur battery of the present invention. As shown in the FIGURE, an all-solid-state lithium-sulfur battery 10 includes an anode 2, a solid electrolyte layer 3, and a cathode mixture layer 4 that are laminated in this order, and also includes current collectors (an anode current collector 1 and a cathode current collector 5) on its sides. The current collector (anode current collector, cathode current collector), the anode, the solid electrolyte layer, and the cathode mixture layer are described in this order below.

<Current Collector>

The current collector is not particularly limited. For example, Al, Cu, Ni, stainless steel and the like can be used. As the anode current collector, Cu is preferably used because it is less likely to form an alloy with lithium and it can be easily processed into a thin membrane. As the cathode current collector, Al is preferably used because it can be easily processed into a thin membrane and it is low cost.

<Anode>

The anode is not particularly limited as long as it contains a material that absorbs and releases lithium ions as an anode active material. Examples of the material that absorbs and releases lithium ions include metallic lithium, lithium alloys, metal oxides, metal sulfides, and carbonaceous materials that absorb and release lithium ions. Examples of lithium alloys include alloys of lithium with aluminum, silicon, tin, magnesium, indium, calcium, or the like. Examples of metal oxides include tin oxides, silicon oxides, lithium titanium oxides, niobium oxides, and tungsten oxides. Examples of metal sulfides include tin sulfides and titanium sulfides. Examples of carbonaceous materials that absorb and release lithium ions include graphite, coke, mesophase pitch carbon fibers, spherical carbon, and resin baked carbon.

The anode may be prepared by any method. Examples include a method in which the material that absorbs and releases lithium ions is pressed and a method in which an anode precursor dispersion containing the material that absorbs and releases lithium ions and a solvent is applied to an anode current collector, dried and pressed. The solvent contained in the anode precursor dispersion may be as described above for the cathode mixture. The solvent is used to facilitate application of the anode precursor dispersion, and is removed by drying after the application.

<Solid Electrolyte Layer>

The solid electrolyte layer may be formed of a polymeric solid electrolyte and/or an inorganic solid electrolyte. The inorganic solid electrolyte may be a solid electrolyte having an electric conductivity of 0.1 mS/cm or higher, for example. Although the solid electrolyte is not particularly limited as long as it has an electric conductivity of 0.1 mS/cm or higher, specific examples include lithium salts, lithium sulfides, lithium oxides, and lithium nitrides.

The solid electrolyte is preferably a lithium salt, a lithium sulfide, or a combination thereof, because of their high electric conductivity and low grain boundary resistance.

Examples of the lithium salt include, but are not limited to, $LiBH_4$ and LiI. Examples of the lithium sulfide include, but are not limited to, composites with the $P_xS_y$ described above, specifically, the composites of $Li_2S$ and $P_xS_y$ described above. Other examples include composites of $Li_2S$ and $P_xS_y$, and further $GeS_2$, $SiS_2$, $Li_3PO_4$, $Li_4SiO_4$, or the like. Examples of the lithium oxide include, but are not limited to, $Li_2O$ and $Li_2O_2$. Examples of the lithium nitride include, but are not limited to, $Li_3N$. These solid electrolytes may be used alone or in combinations of two or more.

The solid electrolyte layer formed of the inorganic solid electrolyte may be prepared by, for example, a method in which the solid electrolyte is press-formed or a method in which the solid electrolyte is dispersed in a solvent and the dispersion is applied and dried. The method in which the solid electrolyte is press-formed is not particularly limited, and may be carried out for example by sandwiching and pressing the solid electrolyte between an anode current collector and a cathode current collector, or by pressing the solid electrolyte using a jig of a press. In the case where the solid electrolyte layer is prepared by the method in which the solid electrolyte is dispersed in a solvent and the dispersion is applied and dried, the dried solid electrolyte layer may be pressed in the same manner as described above. The solvent used for dispersing the solid electrolyte may be as described above for the cathode mixture. When the solid electrolyte layer is prepared by these methods, heat treatment may be performed at any timing in order to reduce the interfacial resistance of the solid electrolyte layer and to improve the compactness thereof.

Examples of the solid electrolyte layer formed of the polymeric solid electrolyte include polyethylene oxide polymers containing lithium salts such as lithium perchlorate or lithium bis(trifluoromethanesulfonyl)amide.

<Cathode Mixture Layer>

The cathode mixture layer may be prepared by, for example, a method in which the cathode mixture is supported on a cathode current collector or a method in which the cathode mixture is press-formed. The method in which the cathode mixture is supported on a cathode current collector is not particularly limited, and may be carried out for example by press-forming the cathode mixture, or by making the cathode mixture into a paste using an organic solvent or the like, applying the resulting cathode mixture to a cathode current collector, drying and then fixing them to each other by, for example, pressing. The method in which the cathode mixture is press-formed is not particularly limited, and may be carried out for example by sandwiching and pressing the cathode mixture between a solid electrolyte layer and a cathode current collector, or by pressing the cathode mixture using a jig of a press. The cathode mixture may be applied to a cathode current collector by any method, such as by slit die coating, screen coating, curtain coating, knife coating, gravure coating, or electrostatic spray coating. When the cathode mixture layer is prepared by these methods, heat treatment may be performed at any timing in order to reduce the interfacial resistance of the cathode mixture layer and to improve the compactness thereof.

The all-solid-state lithium-sulfur battery may include a separator and the like in addition to the above-described anode current collector, anode, solid electrolyte layer, cathode mixture layer, and cathode current collector. The all-solid-state lithium-sulfur battery may have any shape, such as a coin, button, sheet, laminate, cylindrical, flat, or rectangular shape.

<Method for Preparing all-Solid-State Lithium-Sulfur Battery>

The all-solid-state lithium-sulfur battery may be prepared by any method such as those described below.

First, a solid electrolyte is sandwiched and pressed between an anode current collector and a cathode current collector to prepare a solid electrolyte layer. Next, a cathode mixture is deposited on one side of the solid electrolyte layer and the stack is sandwiched and pressed between the current collectors (the anode current collector on the solid electrolyte layer side, and the cathode current collector on the cathode mixture side). Thus, the cathode mixture layer and the cathode current collector are laminated on one face of the solid electrolyte layer, while the anode current collector is laminated on the other face of the solid electrolyte layer. Finally, after the anode current collector is removed temporarily, an anode is put on the solid electrolyte layer on the side opposite to the cathode mixture layer and then the anode current collector is put on the anode side, followed by pressing. Thus, the anode and the anode current collector are laminated on the other face of the solid electrolyte layer. Moreover, the layers may be pressed one by one as described above, or two or more layers may be deposited and pressed together to form a laminate. The all-solid-state lithium-sulfur battery can be prepared by such methods.

<Application of all-Solid-State Lithium-Sulfur Battery>

The all-solid-state lithium-sulfur battery may be used in any application. For example, the all-solid-state lithium-sulfur battery is suitable for electrical products that require high energy density, such as hybrid cars and electric cars. The present invention therefore can contribute to reducing $CO_2$ emissions.

EXAMPLES

The present invention is described with reference to examples below, but the present invention is not limited to these examples.

1. Preparation of Cathode Active Material (Component (A)/Component (B))

(Cathode Active Material P(0))

Sulfur (Aldrich) was used as a cathode active material P(0).

(Cathode Active Material P(3))

Sulfur (Aldrich) and elemental phosphorus (Aldrich) were mixed at a weight ratio of 97:3 using a planetary ball mill at a rotation speed of 185 rpm and a revolution speed of 370 rpm (in the counter direction to the rotation) for 4 hours to give a cathode active material P(3) which contained elemental phosphorus in an amount of 3% by weight of the amount of sulfur.

(Cathode Active Material P(5))

Sulfur (Aldrich) and elemental phosphorus (Aldrich) were mixed at a weight ratio of 95:5 using a planetary ball mill at a rotation speed of 185 rpm and a revolution speed of 370 rpm (in the counter direction to the rotation) for 4 hours to give a cathode active material P(5) which contained elemental phosphorus in an amount of 5% by weight of the amount of sulfur.

(Cathode Active Material P(6))

Sulfur (Aldrich) and elemental phosphorus (Aldrich) were mixed at a weight ratio of 94:6 using a planetary ball mill at a rotation speed of 185 rpm and a revolution speed of 370 rpm (in the counter direction to the rotation) for 4 hours to give a cathode active material P(6) which contained elemental phosphorus in an amount of 6% by weight of the amount of sulfur.

(Cathode Active Material P(8))

Sulfur (Aldrich) and elemental phosphorus (Aldrich) were mixed at a weight ratio of 92:8 using a planetary ball mill at a rotation speed of 185 rpm and a revolution speed of 370 rpm (in the counter direction to the rotation) for 4 hours to give a cathode active material P(8) which contained elemental phosphorus in an amount of 8% by weight of the amount of sulfur.

(Cathode Active Material P(11))

Sulfur (Aldrich) and elemental phosphorus (Aldrich) were mixed at a weight ratio of 89:11 using a planetary ball mill at a rotation speed of 185 rpm and a revolution speed of 370 rpm (in the counter direction to the rotation) for 4 hours to give a cathode active material P(11) which contained elemental phosphorus in an amount of 11% by weight of the amount of sulfur.

(Cathode Active Material P(14))

Sulfur (Aldrich) and elemental phosphorus (Aldrich) were mixed at a weight ratio of 86:14 using a planetary ball mill at a rotation speed of 185 rpm and a revolution speed of 370 rpm (in the counter direction to the rotation) for 4 hours to give a cathode active material P(14) which contained elemental phosphorus in an amount of 14% by weight of the amount of sulfur.

(Cathode Active Material P(20))

Sulfur (Aldrich) and elemental phosphorus (Aldrich) were mixed at a weight ratio of 80:20 using a planetary ball mill at a rotation speed of 185 rpm and a revolution speed of 370 rpm (in the counter direction to the rotation) for 4 hours to give a cathode active material P(20) which contained elemental phosphorus in an amount of 20% by weight of the amount of sulfur.

(Cathode Active Material PS(5))

Sulfur (Aldrich) and $P_2S_5$ (Aldrich) were mixed at a weight ratio of 95:5 using a planetary ball mill at a rotation speed of 185 rpm and a revolution speed of 370 rpm (in the counter direction to the rotation) for 4 hours to give a cathode active material PS(5) which contained $P_2S_5$ in an amount of 5% by weight of the amount of sulfur.

(Cathode Active Material PS(10))

Sulfur (Aldrich) and $P_2S_5$ (Aldrich) were mixed at a weight ratio of 90:10 using a planetary ball mill at a rotation speed of 185 rpm and a revolution speed of 370 rpm (in the counter direction to the rotation) for 4 hours to give a cathode active material PS(10) which contained $P_2S_5$ in an amount of 10% by weight of the amount of sulfur.

(Cathode Active Material PS(20))

Sulfur (Aldrich) and $P_2S_5$ (Aldrich) were mixed at a weight ratio of 80:20 using a planetary ball mill at a rotation speed of 185 rpm and a revolution speed of 370 rpm (in the counter direction to the rotation) for 4 hours to give a cathode active material PS(20) which contained $P_2S_5$ in an amount of 20% by weight of the amount of sulfur.

(Cathode Active Material PS(25))

Sulfur (Aldrich) and $P_2S_5$ (Aldrich) were mixed at a weight ratio of 75:25 using a planetary ball mill at a rotation speed of 185 rpm and a revolution speed of 370 rpm (in the counter direction to the rotation) for 4 hours to give a cathode active material PS(25) which contained $P_2S_5$ in an amount of 25% by weight of the amount of sulfur.

(Cathode Active Material PS(33))

Sulfur (Aldrich) and $P_2S_5$ (Aldrich) were mixed at a weight ratio of 67:33 using a planetary ball mill at a rotation speed of 185 rpm and a revolution speed of 370 rpm (in the counter direction to the rotation) for 4 hours to give a cathode active material PS(33) which contained $P_2S_5$ in an amount of 33% by weight of the amount of sulfur.

2. Preparation of Ion-Conductive Material (Component (C))

(Ion-Conductive Material A)

$Li_2S$ (Furuuchi Chemical Co.) and $P_2S_5$ (Aldrich) were weighed in a molar ratio of 80:20 and mixed in a mortar. The mixture was treated in a planetary ball mill at a rotation speed of 250 rpm and a revolution speed of 500 rpm (in the counter direction to the rotation) for 10 hours to give an ion-conductive material A in which the weight ratio of phosphorus was 0.153. The obtained ion-conductive material A had an electric conductivity of 0.4825 mS/cm.

The electric conductivity of ion-conductive materials was measured as follows.

A SUS304 cylindrical jig (10 mm Φ, height 10 mm) (hereafter, also referred to as current collector 2) was inserted into a polycarbonate cylindrical tube jig (inner diameter 10 mm Φ, outer diameter 23 mm Φ, height 20 mm) from the bottom, 70 mg of the ion-conductive material was put into the polycarbonate cylindrical tube jig from the top, and then a SUS304 cylindrical jig (10 mm Φ, height 15 mm) (hereafter, also referred to as current collector 1) was inserted into the polycarbonate cylindrical tube jig from the top to sandwich the ion-conductive material therebetween. The sandwiched ion-conductive material was pressed at a pressure of 200 MPa for 3 minutes to form an ion-conductive material layer having a diameter of 10 mm Φ and a thickness of about 0.5 mm. In this way, test samples for measuring electric conductivity were prepared. The resistance of the test samples was determined by alternating current impedance analysis with Cell Test System 1400 (Solartron), and the electric conductivity was calculated using the thickness and diameter of the ion-conductive material layer (applied voltage 50 mV, measurement frequency 1 to 1,000,000 Hz).

(Ion-Conductive Material B)

$Li_2S$ and $P_2S_5$ were weighed in a molar ratio of 65:35 and mixed in a mortar. The mixture was treated in a planetary ball mill at a rotation speed of 250 rpm and a revolution speed of 500 rpm (in the counter direction to the rotation) for 10 hours to give an ion-conductive material B in which the weight ratio of phosphorus was 0.201. The obtained ion-conductive material B had an electric conductivity of 0.0584 mS/cm.

(Ion-Conductive Material C)

$Li_2S$ and $P_2S_5$ were weighed in a molar ratio of 60:40 and mixed in a mortar. The mixture was treated in a planetary ball mill at a rotation speed of 250 rpm and a revolution speed of 500 rpm (in the counter direction to the rotation) for 10 hours to give an ion-conductive material C in which the weight ratio of phosphorus was 0.213. The obtained ion-conductive material C had an electric conductivity of 0.0209 mS/cm.

(Ion-Conductive Material D)

$Li_2S$ and $P_2S_5$ were weighed in a molar ratio of 40:60 and mixed in a mortar. The mixture was treated in a planetary ball mill at a rotation speed of 250 rpm and a revolution speed of 500 rpm (in the counter direction to the rotation) for 10 hours to give an ion-conductive material D in which the weight ratio of phosphorus was 0.245. The obtained ion-conductive material D had an electric conductivity of 0.0003 mS/cm.

(Ion-Conductive Material E)

$Li_2S$, red phosphorus, and sulfur were weighed in a molar ratio of 1.8:2:3.2 and mixed in a mortar. The mixture was treated in a planetary ball mill at a rotation speed of 250 rpm and a revolution speed of 500 rpm (in the counter direction to the rotation) for 10 hours to give an ion-conductive material E in which the weight ratio of phosphorus was 0.250. The obtained ion-conductive material E had an electric conductivity of 0.1644 mS/cm.

(Ion-Conductive Material F)

$Li_2S$, red phosphorus, and sulfur were weighed in a molar ratio of 1.8:2:2.2 and mixed in a mortar. The mixture was treated in a planetary ball mill at a rotation speed of 250 rpm and a revolution speed of 500 rpm (in the counter direction to the rotation) for 10 hours to give an ion-conductive material F in which the weight ratio of phosphorus was 0.288. The obtained ion-conductive material F had an electric conductivity of 0.0761 mS/cm.

(Ion-Conductive Material G)

$Li_2S$, red phosphorus, and sulfur were weighed in a molar ratio of 1.2:2:1.4 and mixed in a mortar. The mixture was treated in a planetary ball mill at a rotation speed of 250 rpm and a revolution speed of 500 rpm (in the counter direction to the rotation) for 10 hours to give an ion-conductive material G in which the weight ratio of phosphorus was 0.382. The obtained ion-conductive material G had an electric conductivity of 0.0333 mS/cm.

(Ion-Conductive Material H)

$Li_2S$, red phosphorus, and sulfur were weighed in a molar ratio of 0.8:2:1.4 and mixed in a mortar. The mixture was treated in a planetary ball mill at a rotation speed of 250 rpm and a revolution speed of 500 rpm (in the counter direction to the rotation) for 10 hours to give an ion-conductive material H in which the weight ratio of phosphorus was 0.431. The obtained ion-conductive material H had an electric conductivity of 0.0086 mS/cm.

3. Preparation of Conductive Material (Component (D))

(Conductive Material A)

Furnace black (Ketjen black EC600JD, Lion Corporation, specific surface area: 1200 m$^2$/g) was used as a conductive material A.

(Conductive Material B)

Activated charcoal (Kansai Coke and Chemicals Company, Limited, specific surface area: 3000 m$^2$/g) was used as a conductive material B.

(Conductive Material C)

A mixture of 9 parts by weight of activated charcoal (Kansai Coke and Chemicals Company, Limited, specific surface area: 3000 m$^2$/g) and 1 part by weight of furnace black (Ketjen black EC600JD, Lion Corporation, specific surface area: 1200 m$^2$/g) was used as a conductive material C.

(Conductive Material D)

A mixture of 9 parts by weight of activated charcoal (Kansai Coke and Chemicals Company, Limited, specific surface area: 3000 m$^2$/g) and 1 part by weight of graphite (Wako Pure Chemical Industries, Ltd., specific surface area: 5 m$^2$/g) was used as a conductive material D.

4. Preparation of Cathode Mixture

Examples 1 to 3 and Comparative Example 1

The cathode active material shown in Table 1 was used as the cathode active material (component (A)+component (B)) the ion-conductive material A was used as the ion-conductive material (component (C)), and the conductive material A was used as the conductive material (component (D)). An amount of 100 mg of the cathode active material, 80 mg of the ion-conductive material, and 20 mg of the conductive material were weighed so that these components were present in a compositional ratio (weight ratio) of 50:40:10. Using a planetary ball mill (premium line P-7, Frilsch, revolution radius: 0.07 m, rotation radius: 0.0235 m, ratio of rotation to revolution: −2), these components were then mixed in a 45 mL pot with 5 mm zirconia balls (about 40 g) at a revolution speed of 370 rpm for 4 hours to prepare a cathode mixture for all-solid-state lithium-sulfur batteries.

Examples 4, 5

The cathode active material shown in Table 1 was used as the cathode active material (component (A)+component (B)), the ion-conductive material C was used as the ion-conductive material (component (C)), and the conductive material A was used as the conductive material (component (D)). An amount of 100 mg of the cathode active material, 80 mg of the ion-conductive material, and 20 mg of the conductive material were weighed so that these components were present in a compositional ratio (weight ratio) of 50:40:10, and mixed under the same conditions as in Example 1 to prepare a cathode mixture for all-solid-state lithium-sulfur batteries.

Examples 6 to 9

The cathode active material shown in Table 1 was used as the cathode active material (component (A)+component (B)), the ion-conductive material D was used as the ion-conductive material (component (C)), and the conductive material A was used as the conductive material (component (D)). An amount of 100 mg of the cathode active material, 80 mg of the ion-conductive material, and 20 mg of the conductive material were weighed so that these components were present in a compositional ratio (weight ratio) of 50:40:10, and mixed under the same conditions as in Example 1 to prepare a cathode mixture for all-solid-state lithium-sulfur batteries.

Example 10

The cathode active material PS(10) was used as the cathode active material (component (A)+component (B)), the ion-conductive material E was used as the ion-conductive material (component (C)), and the conductive material A was used as the conductive material (component (D)). An amount of 100 mg of the cathode active material, 80 mg of the ion-conductive material, and 20 mg of the conductive material were weighed so that these components were present in a compositional ratio (weight ratio) of 50:40:10, and mixed under the same conditions as in Example 1 to prepare a cathode mixture for all-solid-state lithium-sulfur batteries.

Comparative Example 2

The cathode active material P(0) was used as the cathode active material (component (A)+component (B)), the ion-conductive material A was used as the ion-conductive material (component (C)), and the conductive material A was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Examples 11, 12

The cathode active material shown in Table 1 was used as the cathode active material (component (A)+component (B)), the ion-conductive material C was used as the ion-conductive material (component (C)), and the conductive material A was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Examples 13 to 15

The cathode active material shown in Table 1 was used as the cathode active material (component (A)+component (B)), the ion-conductive material D was used as the ion-conductive material (component (C)), and the conductive material A was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 16

The cathode active material PS(5) was used as the cathode active material (component (A)+component (B)), the ion-conductive material F was used as the ion-conductive material (component (C)), and the conductive material A was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 17

The cathode active material PS(10) was used as the cathode active material (component (A)+component (B)), the ion-conductive material C was used as the ion-conductive material (component (C)), and the conductive material A was used as the conductive material (component (D)). An amount of 126 mg of the cathode active material, 54 mg of the ion-conductive material, and 20 mg of the conductive material were weighed so that these components were present in a compositional ratio (weight ratio) of 63:27:10, and mixed under the same conditions as in Example 1 to prepare a cathode mixture for all-solid-state lithium-sulfur batteries.

Example 18

The cathode active material PS(5) was used as the cathode active material (component (A)+component (B)), the ion-conductive material F was used as the ion-conductive material (component (C)), and the conductive material A was used as the conductive material (component (D)). An amount of 126 mg of the cathode active material, 54 mg of the ion-conductive material, and 20 mg of the conductive material were weighed so that these components were present in a compositional ratio (weight ratio) of 63:27:10, and mixed under the same conditions as in Example 1 to prepare a cathode mixture for all-solid-state lithium-sulfur batteries.

Comparative Example 3

The cathode active material P(0) was used as the cathode active material (component (A)+component (B)), the ion-conductive material A was used as the ion-conductive material (component (C)), and the conductive material A was used as the conductive material (component (D)). An amount of 130 mg of the cathode active material, 50 mg of the ion-conductive material, and 20 mg of the conductive material were weighed so that these components were present in a compositional ratio (weight ratio) of 65:25:10, and mixed under the same conditions as in Example 1 to prepare a cathode mixture for all-solid-state lithium-sulfur batteries.

Comparative Example 4

The cathode active material P(0) was used as the cathode active material (component (A)+component (B)), the ion-conductive material A was used as the ion-conductive material (component (C)), and the conductive material A was used as the conductive material (component (D)). An amount of 140 mg of the cathode active material, 40 mg of the ion-conductive material, and 20 mg of the conductive material were weighed so that these components were present in a compositional ratio (weight ratio) of 70:20:10, and mixed under the same conditions as in Example 1 to prepare a cathode mixture for all-solid-state lithium-sulfur batteries.

Example 19

The cathode active material P(5) was used as the cathode active material (component (A)+component (B)), the ion-conductive material C was used as the ion-conductive material (component (C)), and the conductive material B was used as the conductive material (component (D)). An amount of 80 mg of the cathode active material, 100 mg of the ion-conductive material, and 20 mg of the conductive material were weighed so that these components were present in a compositional ratio (weight ratio) of 40:50:10, and mixed under the same conditions as in Example 1 to prepare a cathode mixture for all-solid-state lithium-sulfur batteries.

Example 20

The cathode active material PS(10) was used as the cathode active material (component (A)+component (B)), the ion-conductive material B was used as the ion-conductive material (component (C)), and the conductive material B was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Examples 21 to 23

The cathode active material shown in Table 1 was used as the cathode active material (component (A)+component (B)), the ion-conductive material C was used as the ion-conductive material (component (C)), and the conductive material B was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 24

The cathode active material P(5) was used as the cathode active material (component (A)+component (B)), the ion-conductive material G was used as the ion-conductive material (component (C)), and the conductive material B was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 25

The cathode active material PS(10) was used as the cathode active material (component (A)+component (B)), the ion-conductive material H was used as the ion-conductive material (component (C)), and the conductive material B was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 26

The cathode active material PS(10) was used as the cathode active material (component (A)+component (B)), the ion-conductive material B was used as the ion-conductive material (component (C)), and the conductive material B was used as the conductive material (component (D)). An amount of 130 mg of the cathode active material, 50 mg of the ion-conductive material, and 20 mg of the conductive material were weighed so that these components were present in a compositional ratio (weight ratio) of 65:25:10, and mixed under the same conditions as in Example 1 to prepare a cathode mixture for all-solid-state lithium-sulfur batteries.

Example 27

The cathode active material PS(10) was used as the cathode active material (component (A)+component (B)), the ion-conductive material B was used as the ion-conductive material (component (C)), and the conductive material B was used as the conductive material (component (D)). An amount of 140 mg of the cathode active material, 40 mg of the ion-conductive material, and 20 mg of the conductive material were weighed so that these components were present in a compositional ratio (weight ratio) of 70:20:10, and mixed under the same conditions as in Example 1 to prepare a cathode mixture for all-solid-state lithium-sulfur batteries.

Example 28

The cathode active material PS(10) was used as the cathode active material (component (A)+component (B)), the ion-conductive material B was used as the ion-conductive material (component (C)), and the conductive material C was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 29

The cathode active material PS(10) was used as the cathode active material (component (A)+component (B)), the ion-conductive material B was used as the ion-conductive material (component (C)), and the conductive material C was used as the conductive material (component (D)). An amount of 130 mg of the cathode active material, 50 mg of the ion-conductive material, and 20 mg of the conductive material were weighed so that these components were present in a compositional ratio (weight ratio) of 65:25:10, and mixed under the same conditions as in Example 1 to prepare a cathode mixture for all-solid-state lithium-sulfur batteries.

Examples 30, 31

The cathode active material shown in Table 1 was used as the cathode active material (component (A)+component (B)), the ion-conductive material B was used as the ion-conductive material (component (C)), and the conductive material D was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 32

The cathode active material PS(10) was used as the cathode active material (component (A)+component (B)), the ion-conductive material C was used as the ion-conductive material (component (C)), and the conductive material D was used as the conductive material (component (D)). An amount of 120 mg of the cathode active material, 60 mg of the ion-conductive material, and 20 mg of the conductive material were weighed so that these components were present in a compositional ratio (weight ratio) of 60:30:10, and mixed under the same conditions as in Example 1 to prepare a cathode mixture for all-solid-state lithium-sulfur batteries.

Example 33

The cathode active material PS(10) was used as the cathode active material (component (A)+component (B)), the ion-conductive material C was used as the ion-conductive material (component (C)), and the conductive material D was used as the conductive material (component (D)). An amount of 130 mg of the cathode active material, 50 mg of the ion-conductive material, and 20 mg of the conductive material were weighed so that these components were present in a compositional ratio (weight ratio) of 65:25:10, and mixed under the same conditions as in Example 1 to prepare a cathode mixture for all-solid-state lithium-sulfur batteries.

5. Preparation of all-Solid-State Lithium-Sulfur Battery

A SUS 304 cylindrical jig (10 mm Φ, height 10 mm) as an anode current collector was inserted into a polycarbonate cylindrical tube jig (inner diameter 10 mm Φ, outer diameter 23 mm Φ, height 20 mm) from the bottom, 70 mg of a solid electrolyte (a composite obtained by firing $5Li_2S$—$GeS_2$—$P_2S_5$ at 510° C. for 8 hours) was put into the polycarbonate cylindrical tube jig from the top, and then a SUS304 cylindrical tube jig (10 mm Φ, height 15 mm) as a cathode current collector was inserted into the polycarbonate cylindrical tube jig from the top to sandwich the solid electrolyte therebetween. The sandwiched solid electrolyte was pressed at a pressure of 200 MPa for 3 minutes to form a solid electrolyte layer having a diameter of 10 mm Φ and a thickness of about 0.6 mm.

Next, after the SUS304 cylindrical jig (cathode current collector) inserted from the top was pulled out temporarily, one of the cathode mixtures prepared in the examples and the comparative examples in an amount corresponding to 3.75 mg of the cathode active material was put on the solid electrolyte layer in the polycarbonate cylindrical tube, and the SUS304 cylindrical jig (cathode current collector) was again inserted from the top. Then, the cathode mixture was pressed at a pressure of 200 MPa for 3 minutes to forma cathode mixture layer having a diameter of 10 mm Φ and a thickness of about 0.1 mm.

Next, after the SUS304 cylindrical jig (anode current collector) inserted from the bottom was pulled out, a stack of a 0.25 mm-thick lithium sheet (Furuuchi Chemical Co.) punched to a diameter of 8 mm Φ using a hollow punch and a 0.3 mm-thick indium sheet (Furuuchi Chemical Co.) punched to a diameter of 9 mm Φ using a hollow punch as an anode was put into the polycarbonate cylindrical tube jig from the bottom, and the SUS304 cylindrical jig (anode current collector) was again inserted from the bottom. Then, the stack was pressed at a pressure of 80 MPa for 3 minutes to form a lithium-indium alloy anode. In this way, all-solid-state lithium-sulfur batteries in which an anode current collector, a lithium-indium alloy anode, a solid electrolyte layer, a cathode mixture layer, and a cathode current collector were laminated in this order from the bottom were prepared.

6. Evaluation Method (Charge/Discharge Test)

The all-solid-state lithium-sulfur batteries prepared as above were charged to full at a current density of 0.64 mA/cm² using a charge/discharge device (ACD-M01A, Aska Electronic Co., Ltd.), and then the capacity per cathode mixture of each battery during discharge at a current density of 6.4 mA/cm² was measured. Table 1 shows the results.

TABLE 1

| Component (C) | | | Compositional ratio (weight ratio) of components (A) + (B), component (C), and component (D) | | | | | | | |
|---|---|---|---|---|---|---|---|---|---|---|
| | | | (A) + (B):(C):(D) = 40:50:10 | | | (A) + (B):(C):(D) = 50:40:10 | | | (A) + (B):(C):(D) = 60:30:10 | | |
| | | | Type of cathode active material ((A) + (B)) and Capacity (mAh/g) per cathode mixture during discharge at 6.4 mA/cm² | | | | | | | | |
| | Weight ratio of phosphorus | Component (D) | Example/ Comparative Example | Cathode active material | Capacity | Example/ Comparative Example | Cathode active material | Capacity | Example/ Comparative Example | Cathode active material | Capacity |
| A | 0.153 | A | | | | Comparative Example 1 | P(0) | 133 | Comparative Example 2 | P(0) | 56 |
| | | | | | | Example 1 | PS(10) | 204 | | | |
| | | | | | | Example 2 | P(14) | 343 | | | |
| | | | | | | Example 3 | P(11) | 330 | | | |
| B | 0.201 | B | | | | | | | Example 20 | PS(10) | 367 |
| | | C | | | | | | | Example 28 | PS(10) | 401 |
| | | D | | | | | | | Example 30 | PS(10) | 323 |
| | | | | | | | | | Example 31 | P(5) | 327 |
| C | 0.213 | A | | | | Example 4 | PS(10) | 361 | Example 11 | PS(5) | 278 |
| | | | | | | Example 5 | PS(20) | 361 | Example 12 | PS(10) | 278 |
| | | B | Example 19 | P(5) | 393 | | | | Example 21 | P(5) | 378 |
| | | | | | | | | | Example 22 | PS(25) | 456 |
| | | | | | | | | | Example 23 | PS(33) | 456 |
| | | D | | | | | | | Example 32 | PS(10) | 401 |
| D | 0.245 | A | | | | Example 6 | P(20) | 223 | Example 13 | P(11) | 278 |
| | | | | | | Example 7 | P(3) | 378 | Example 14 | P(8) | 300 |
| | | | | | | Example 8 | P(14) | 359 | Example 15 | P(6) | 278 |
| | | | | | | Example 9 | P(11) | 378 | | | |
| E | 0.250 | A | | | | Example 10 | PS(10) | 287 | | | |
| F | 0.288 | A | | | | | | | Example 16 | PS(5) | 300 |
| G | 0.382 | B | | | | | | | Example 24 | P(5) | 423 |
| H | 0.431 | B | | | | | | | Example 25 | PS(10) | 345 |

| Component (C) | | | Compositional ratio (weight ratio) of components (A) + (B), component (C), and component (D) | | | | | | | |
|---|---|---|---|---|---|---|---|---|---|---|
| | | | (A) + (B):(C):(D) = 63:27:10 | | | (A) + (B):(C):(D) = 65:25:10 | | | (A) + (B):(C):(D) = 70:20:10 | | |
| | | | Type of cathode active material ((A) + (B)) and Capacity (mAh/g) per cathode mixture during discharge at 6.4 mA/cm² | | | | | | | | |
| | Weight ratio of phosphorus | Component (D) | Example/ Comparative Example | Cathode active material | Capacity | Example/ Comparative Example | Cathode active material | Capacity | Example/ Comparative Example | Cathode active material | Capacity |
| A | 0.153 | A | | | | Comparative Example 3 | P(0) | 28 | Comparative Example 4 | P(0) | 0 |
| B | 0.201 | B | | | | Example 26 | PS(10) | 265 | Example 27 | PS(10) | 272 |
| | | C | | | | Example 29 | PS(10) | 350 | | | |
| | | D | | | | | | | | | |
| C | 0.213 | A | Example 17 | PS(10) | 292 | | | | | | |
| | | B | | | | | | | | | |
| | | D | | | | Example 33 | PS(10) | 350 | | | |

TABLE 1-continued

| | | | | | | |
|---|---|---|---|---|---|---|
| D | 0.245 | A | | | | |
| E | 0.250 | A | | | | |
| F | 0.288 | A | Example 18 | PS(5) | 245 | |
| G | 0.382 | B | | | | |
| H | 0.431 | B | | | | |

REFERENCE SIGNS LIST

1. Anode current collector
2. Anode
3. Solid electrolyte layer
4. Cathode mixture layer
5. Cathode current collector
10. All-solid-state lithium-sulfur battery

The invention claimed is:

1. A cathode mixture for use in a cathode mixture layer of an all-solid-state lithium-sulfur battery, the cathode mixture comprising the following components (A) to (D):
   (A) sulfur and/or its discharge product;
   (B) elemental phosphorus and/or $P_xS_y$, where x and y independently represent an integer that gives a stoichiometric ratio;
   (C) an ion-conductive material; and
   (D) a conductive material,
   wherein the cathode mixture provides an all-solid-state lithium-sulfur battery with a capacity per mass of the cathode mixture of 200 mAh/g or more during discharge at a current density of 6.4 mA/cm$^2$ after the all-solid-state lithium-sulfur battery is fully charged at a current density of 0.64 mA/cm$^2$.

2. The cathode mixture according to claim 1, wherein the component (C) is a composite of Li, S, and P.

3. The cathode mixture according to claim 2, wherein the composite of Li, S, and P is obtained by mechanically milling at least a combination of Li$_2$S, S, and P, or at least a combination of Li$_2$S and P$_x$S$_y$, where x and y independently represent an integer that gives a stoichiometric ratio.

4. The cathode mixture according to claim 3, wherein the composite of Li, S, and P is obtained by mechanically milling the combination of Li$_2$S, S, and P or the combination of Li$_2$S and P$_x$S$_y$, and further at least one selected from the group consisting of phosphorus oxide, lithium oxide, lithium iodide, and M$_z$S where M represents Si, Ge, B, or Al, and z represents an integer that gives a stoichiometric ratio.

5. The cathode mixture according to claim 1, wherein the component (C) contains P at a weight ratio of 0.15 to 0.55.

6. The cathode mixture according to claim 1, which is obtained by mixing the component (A) and the component (B) first and then mixing the resulting mixture with the component (C) and the component (D).

7. The cathode mixture according to claim 1, wherein the component (B) is present in an amount of 1 to 35% by weight of the amount of the component (A).

8. The cathode mixture according to claim 1, wherein the component (D) comprises a conductive component (D1) that comprises a carbon material having a specific surface area of 1000 m$^2$/g or more.

9. The cathode mixture according to claim 8, wherein the component (D) further comprises at least one conductive component (D2) selected from the group consisting of graphite, acetylene black, carbon nanotube, and carbon fiber.

10. The cathode mixture according to claim 1, wherein the component (A) and the component (B) are present in a combined amount of 40% by weight or more of the total cathode mixture.

11. An all-solid-state lithium-sulfur battery, comprising:
    a cathode mixture layer comprising a cathode mixture;
    a solid electrolyte layer;
    an anode; and
    a current collector,
    wherein the cathode mixture includes the following components (A) to (D):
    (A) sulfur and/or its discharge product;
    (B) elemental phosphorus and/or $P_xS_y$, where x and y independently represent an integer that gives a stoichiometric ratio;
    (C) an ion-conductive material; and
    (D) a conductive material,
    wherein the all-solid-state lithium-sulfur battery exhibits a capacity per mass of the cathode mixture of 200 mAh/g or more during discharge at a current density of 6.4 mA/cm$^2$ after the all-solid-state lithium-sulfur battery is fully charged at a current density of 0.64 mA/cm$^2$.

12. A method for producing the cathode mixture according to claim 1, the method at least comprising:
    step (1) of mixing the component (A) and the component (B); and
    step (2) of mixing a mixture obtained in the step (1) with the component (C) and the component (D) simultaneously or separately.

* * * * *